(12) United States Patent (10) Patent No.: US 12,574,637 B2

Otoshi (45) Date of Patent: Mar. 10, 2026

(54) IMAGE CAPTURING APPARATUS THAT CAPTURES IMAGE OF MOVING OBJECT, IMAGE CAPTURING SYSTEM, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Tatsuya Otoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 18/411,566

(22) Filed: Jan. 12, 2024

(65) Prior Publication Data

US 2024/0244319 A1 Jul. 18, 2024

(30) Foreign Application Priority Data

Jan. 17, 2023 (JP) ................................. 2023-005134

(51) Int. Cl.
| | |
|---|---|
| *H04N 23/67* | (2023.01) |
| *H04N 23/66* | (2023.01) |
| *H04N 23/69* | (2023.01) |
| *H04N 23/695* | (2023.01) |

(52) U.S. Cl.
CPC ............. *H04N 23/67* (2023.01); *H04N 23/66* (2023.01); *H04N 23/69* (2023.01); *H04N 23/695* (2023.01)

(58) Field of Classification Search
CPC ........ H04N 23/67; H04N 23/66; H04N 23/69; H04N 23/695; H04N 23/61
See application file for complete search history.

(56) References Cited

U.S. PATENT DOCUMENTS

| | | | | |
|---|---|---|---|---|
| 9,710,731 | B2 * | 7/2017 | Fukuda | .............. G01N 21/9018 |
| 10,803,307 | B2 * | 10/2020 | Sakamoto | ............ G06V 20/588 |
| 2009/0027508 | A1 * | 1/2009 | Miki | .................... H04N 23/683 |
| | | | | 348/208.99 |
| 2014/0079285 | A1 * | 3/2014 | Yamashita | ............. B60K 35/10 |
| | | | | 382/103 |
| 2014/0267594 | A1 * | 9/2014 | Furumura | .............. G03B 37/02 |
| | | | | 348/36 |

FOREIGN PATENT DOCUMENTS

JP 2017-126960 A 7/2017

* cited by examiner

*Primary Examiner* — Hung H Lam

(74) *Attorney, Agent, or Firm* — Cowan, Liebowitz & Latman, P.C.

(57) ABSTRACT

An image capturing apparatus that is capable of setting, when capturing an image of a moving object, an angle of view suitable for the image capturing. The image capturing apparatus includes an image capturing apparatus body configured to capture an image of an object, an object position acquisition section configured to acquire time-varying position information of the object, a movement information prediction section configured to predict, based on the position information, a movement locus to be formed when the object moves after acquisition of the position information, and a view angle determination section configured to determine, based on the movement locus, an angle of view of the image capturing unit.

14 Claims, 11 Drawing Sheets

IMAGE CAPTURING APPARATUS THAT CAPTURES IMAGE OF MOVING OBJECT, IMAGE CAPTURING SYSTEM, METHOD OF CONTROLLING IMAGE CAPTURING APPARATUS, AND STORAGE MEDIUM

BACKGROUND OF THE INVENTION

Field of the Invention

The present invention relates to an image capturing apparatus that captures an image of a moving object, an image capturing system, a method of controlling the image capturing apparatus, and a storage medium.

Description of the Related Art

In recent years, a technique of performing image capturing of a moving image of a moving object or performing continuous image capturing of the moving object, while automatically tracking the moving object, by using an image capturing apparatus comprised of a digital camera or a smartphone, and a panhead or a gimbal on which the digital camera or the smartphone is mounted. To automatically track an object, it is necessary to capture the position information of the object. Examples of methods for capturing the position information of an object include the following two methods: The first method is a method in which an image capturing apparatus receives the position information of an object from a transmitter (position detection device) attached to the object. The second method is a method in which an image processor of the image capturing apparatus detects an object in an angle of view of the image capturing apparatus. Further, in a case where an object is moving, by adjusting an angle of view such that the object falls within the angle of view, based on the position information of the object acquired by the above-mentioned method, it is possible to automatically track the moving object. For example, Japanese Laid-Open Patent Publication (Kokai) No. 2017-126960 discloses a device that detects a position of an object in a screen and a speed of movement of the object in the screen and calculates a correction amount (shift information) required to move the object to a target position in the screen (in a direction orthogonal to an optical axis), based on results of the detections. With this device, the object is tracked by shifting the angle of view of the image capturing apparatus by the correction amount in the direction orthogonal to the optical axis.

However, in the device described in Japanese Laid-Open Patent Publication (Kokai) No. 2017-126960, since the correction amount used for tracking the object is the correction amount for shifting the angle of view in the direction orthogonal to the optical axis, this method is unsuitable for tracking an object which moves in an optical axis direction. Therefore, in a case where the object moves in the optical axis direction, it cab be difficult to perform proper image capturing. Further, since the angle of view is changed after detecting movement of the object, a time lag occurs between the actual movement of the object and the change of the angle of view, which can make it difficult to perform image capturing with a proper angle of view.

SUMMARY OF THE INVENTION

The present invention provides an image capturing apparatus that is capable of setting, when capturing an image of a moving object, an angle of view suitable for the capturing of the image, an image capturing system, a method of controlling the image capturing apparatus, and a storage medium.

In a first aspect of the present invention, there is provided an image capturing apparatus including an image capturing unit configured to capture an image of an object, a position acquisition unit configured to acquire time-varying position information of the object, a locus prediction unit configured to predict, based on the position information, a movement locus to be formed as the object moves after acquisition of the position information, and a view angle determination unit configured to determine, based on the movement locus, an angle of view of the image capturing unit.

In a second aspect of the present invention, there is provided an image capturing system including a plurality of image capturing units each configured to capture an image of an object, a position acquisition unit configured to acquire time-varying position information of the object, a locus prediction unit configured to predict, based on the position information, a movement locus to be formed when the object moves after acquisition of the position information, and a selection unit configured to select an image capturing unit to be preferentially used for capturing an image of the object from the plurality of image capturing units based on the movement locus.

According to the present invention, it is possible to set, when capturing an image of a moving object, an angle of view suitable for the capturing of the image.

Further features of the present invention will become apparent from the following description of exemplary embodiments (with reference to the attached drawings).

BRIEF DESCRIPTION OF THE DRAWINGS

FIG. 3 is a schematic plan view showing an example of a use state of the image capturing apparatus shown in FIG. 1A.

FIG. 8 is a graph showing a movement locus (past movement locus) and a predicted movement locus of an object.

DESCRIPTION OF THE EMBODIMENTS

The present invention will now be described in detail below with reference to the accompanying drawings showing embodiments thereof. However, the following description of the configurations of the embodiments is given by way of example, and the scope of the present invention is not limited to the described configurations of the embodiments. For example, each component of the present invention can be replaced by a desired component which can exhibit the same function. Further, a desired component can be added. Further, two or more desired components (features) of the embodiments can be combined.

Figure 1A:
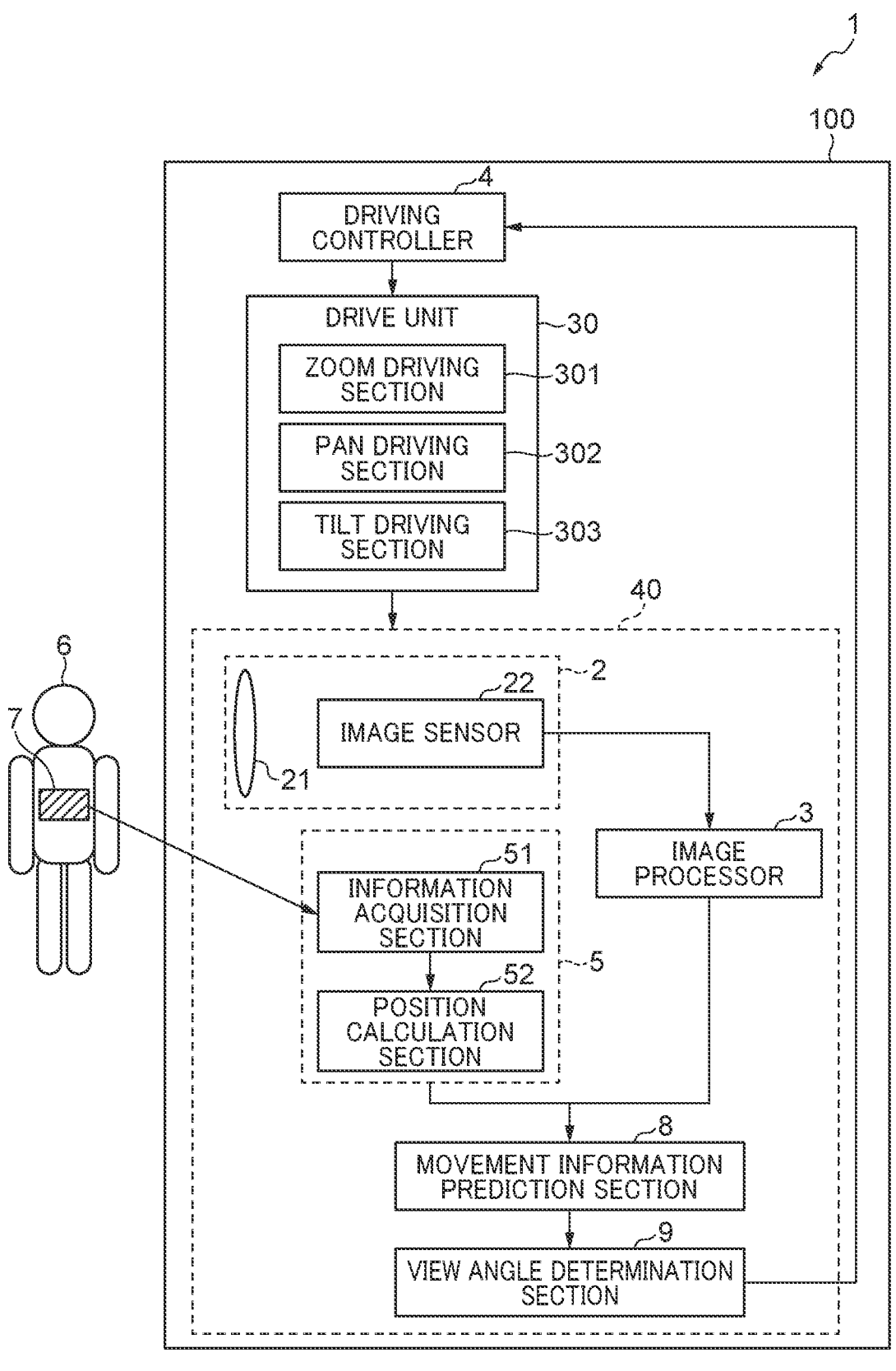
FIG. 1A is a block diagram showing a hardware configuration of an image capturing apparatus according to a first embodiment of the present invention.

Hereafter, a first embodiment will be described with reference to FIGS. 1A to 8. FIG. 1A is a block diagram showing a hardware configuration of an image capturing apparatus according to the first embodiment of the present invention. As shown in FIG. 1A, the image capturing apparatus, denoted by reference numeral 1, includes an image capturing apparatus body 100 that captures an image of an object 6, and a measurement unit 7 attached to the object 6. As shown in FIG. 1A, the image capturing apparatus body 100 includes a lens barrel 2, an image processor 3, a driving controller 4, an object position acquisition section (position acquisition unit) 5, a movement information prediction section (locus prediction unit) 8, a view angle determination section (view angle determination unit) 9, and a drive unit 30. Note that a variety of programs are stored in the image capturing apparatus 1 in advance. These programs include, for example, programs for causing a computer, not shown, such as a central processing unit (CPU), to execute operations of the components of the image capturing apparatus 1. Further, in the present embodiment, the CPU has the functions of the image processor 3, the driving controller 4, the object position acquisition section 5, the movement information prediction section 8, and the view angle determination section 9. Further, in the present embodiment, the lens barrel 2, the image processor 3, the object position acquisition section 5, the movement information prediction section 8, and the view angle determination section 9 are housed in a casing 40.

The lens barrel 2 is an image capturing unit for capturing an image of the object 6, and includes a lens 21 and an image sensor 22. The image sensor 22 is not particularly limited, but for example, a CMOS image sensor or the like is used. The complementary metal-oxide-semiconductor (CMOS) image sensor generates signals by photoelectrically converting light incident through the lens 21 and sends the generated signals to the image processor 3. In the image processor 3, determination of an image capturing scene (shooting scene) and detection of the object 6 are performed. Further, in the image processor 3, a variety of image processing operations, such as white balance adjustment and correction of brightness of an image, are performed, and the processed image data is recorded.

It is preferable that the driving controller 4 is configured to control the drive unit 30 to enable the lens barrel 2 to perform at least one operation of a panning operation, a tilting operation, and a zooming operation. In the present embodiment, the drive unit 30 includes a zoom driving section 301, a pan driving section 302, and a tilt driving section 303. Further, the driving controller 4 functions as a control unit for controlling the drive unit 30 to drive the lens barrel 2 for the panning operation, the tilting operation, and the zooming operation. In this case, the zoom driving section 301 can be driven by a control command from the driving controller 4. With this, it is possible to vary the magnification (performing zooming) of the lens barrel 2 from a wide-angle side to a telephoto side. Further, the pan driving section 302 can be driven by a control command from the driving controller 4. With this, it is possible to rotate the lens barrel 2 together with the casing 40 about an axis (vertical axis) orthogonal to an optical axis O2 to change the image capturing angle of view (perform panning) of the lens barrel 2 in a right-left direction when capturing an image of the object 6 Further, the tilt driving section 303 can be driven by a control command from the driving controller 4. With this, it is possible to rotate the lens barrel 2 together with the casing 40 about an axis (horizontal axis) orthogonal to the optical axis O2 to change the angle of view (perform tilting) in an upper-lower direction. Note that in the image capturing apparatus body 100, the casing 40 can be omitted. In this case, it is possible to rotate only the lens barrel 2 about the axis orthogonal to the optical axis O2 by driving the pan driving section 302. Further, it is possible to rotate only the lens barrel 2 about the axis orthogonal to the optical axis O2 by driving the tilt driving section 303.

Figure 1B:
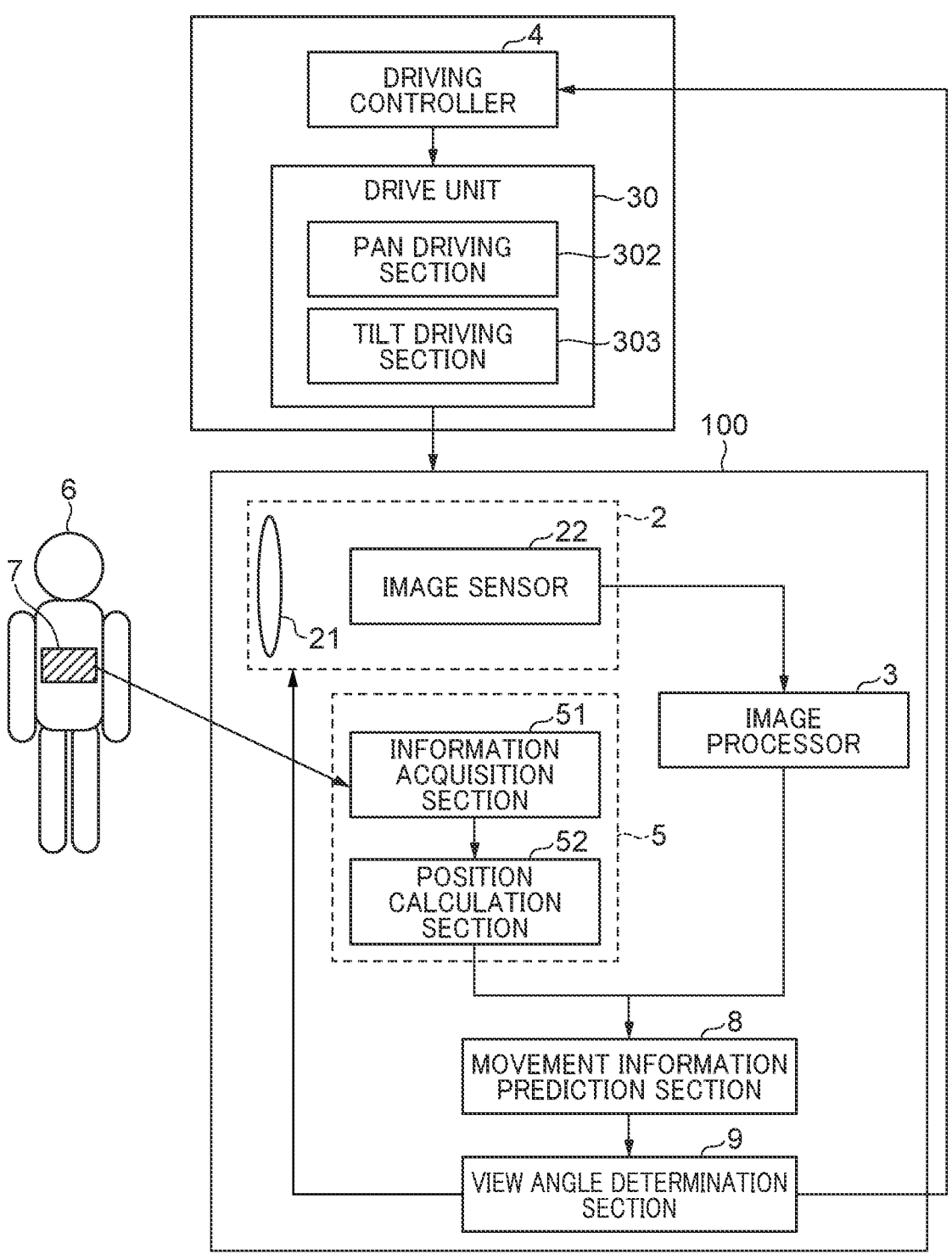
FIG. 1B is a block diagram showing a variation of the hardware configuration of the image capturing apparatus according to the first embodiment of the present invention.

Further, in the configuration as shown in FIG. 1A, the drive unit 30 is included in the image capturing apparatus body 100, but there may be employed such a configuration as shown in FIG. 1B, in which the drive unit 30 is provided outside the image capturing apparatus body 100.

The object position acquisition section 5 is capable of acquiring time-varying position information of the object 6, i.e. the position information changing with time (operation of the position acquisition unit). The object position acquisition section 5 includes an information acquisition section 51 and a position calculation section 52. The information acquisition section 51 acquires the position information transmitted from the measurement unit 7 of the object 6. The position calculation section 52 can calculate a position of the object 6 with respect to the image capturing apparatus 1 based on the position information acquired by the information acquisition section 51. The movement information prediction section 8 predicts movement information (movement locus) of the object 6. A result of this prediction is sent to the view angle determination section 9. The view angle determination section 9 determines an angle of view based on a result of the prediction performed by the movement information prediction section 8 (view angle determination). Then, the driving controller 4 controls the panning operation and the zooming operation of the lens barrel 2 such that the image capturing apparatus 1 has an angle of view determined by the view angle determination section 9. Details of prediction of the movement information (movement locus) of the object 6, performed by the movement information prediction section 8, and determination of the angle of view of the lens barrel 2, performed by the view angle determination section 9, will be described hereinafter.

Figure 2:
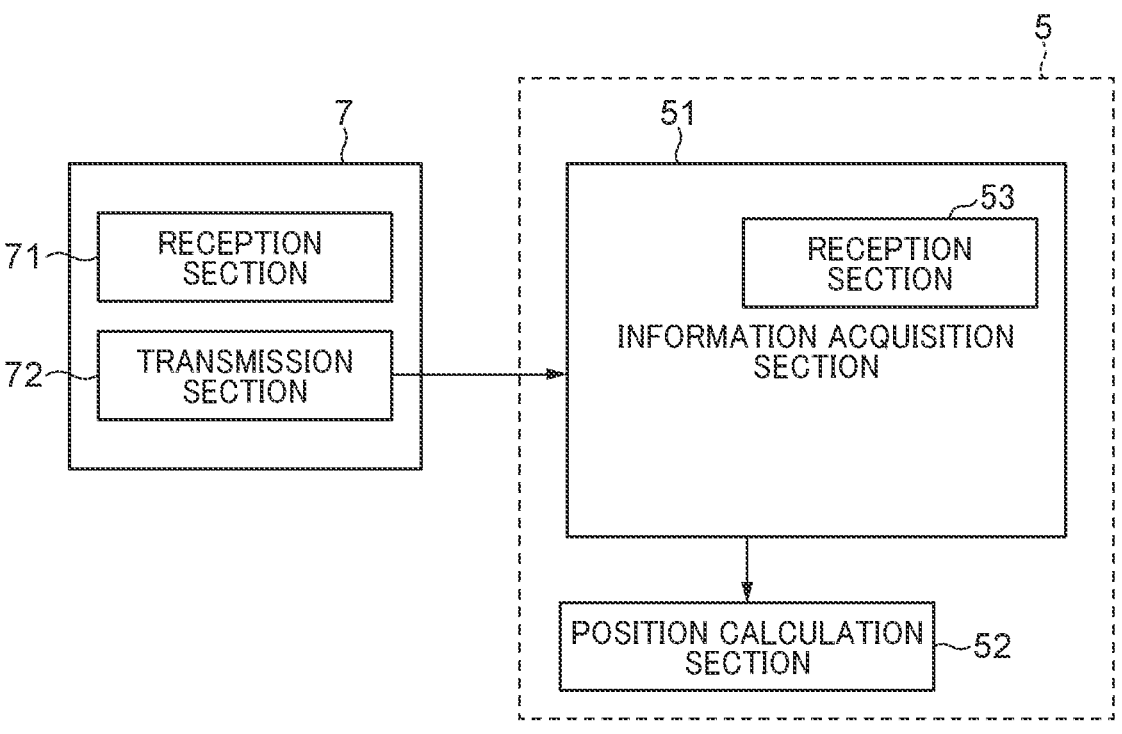
FIG. 2 is a block diagram showing a relationship between hardware components of an object position acquisition section and a measurement unit included in the image capturing apparatus shown in FIG. 1A.

FIG. 2 is a block diagram showing a relationship between hardware components of the object position acquisition section and the measurement unit included in the image capturing apparatus shown in FIG. 1A. The measurement unit 7 measures the position of the object 6 on the earth by using the Global Positioning System (GPS). Note that the method of measuring the position of the object 6 is not limited to the method using the GPS, but, for example, there can be mentioned a method of measuring the relative positions of the measurement unit 7 and the image capturing apparatus 1 by using one or a plurality of transmitters and receivers disposed in the measurement unit 7 and the image capturing apparatus 1, respectively. As shown in FIG. 2, the measurement unit 7 includes a reception section 71 and a transmission section (transmission unit) 72. The reception section 71 receives signals from a plurality of artificial satellites (not shown) and detects the position of the measurement unit 7 based on these signals. A result of the detection is regarded as the position information of the object 6. The position information is recognized as three-dimensional data based on a coordinate system fixed to a macroscopically motionless object, such as the earth. For example, assuming that the center of the earth is set as the origin, it is possible to identify a desired position based on three axes, i.e. the axis of the earth (rotational axis), an axis which passes through the origin and a predetermined point on the equator, and an axis which passes through the origin and is orthogonal to the axis of the earth and the axis which passes through the origin and the predetermined point on the equator. Then, this identified position information is transmitted from the transmission section 72 to the information acquisition section 51 of the object position acquisition section 5.

Further, the information acquisition section 51 includes a reception section 53. The reception section 53 receives, similarly to the reception section 71, signals from the plurality of artificial satellites (not shown) and detects the position of the image capturing apparatus body 100 based on these signals. The position calculation section 52 can calculate the position of the object 6 with respect to the image capturing apparatus body 100 based on the position information of the object 6 (measurement unit 7), which is acquired by the information acquisition section 51, and the position information of the image capturing apparatus body 100. Further, by calculating the three-dimensional position information of the object 6 with respect to the image capturing apparatus body 100 at predetermined time intervals, it is possible to obtain time-varying three-dimensional movement locus information (position information) 80 (see FIG. 3) of the object 6.

Figure 3:
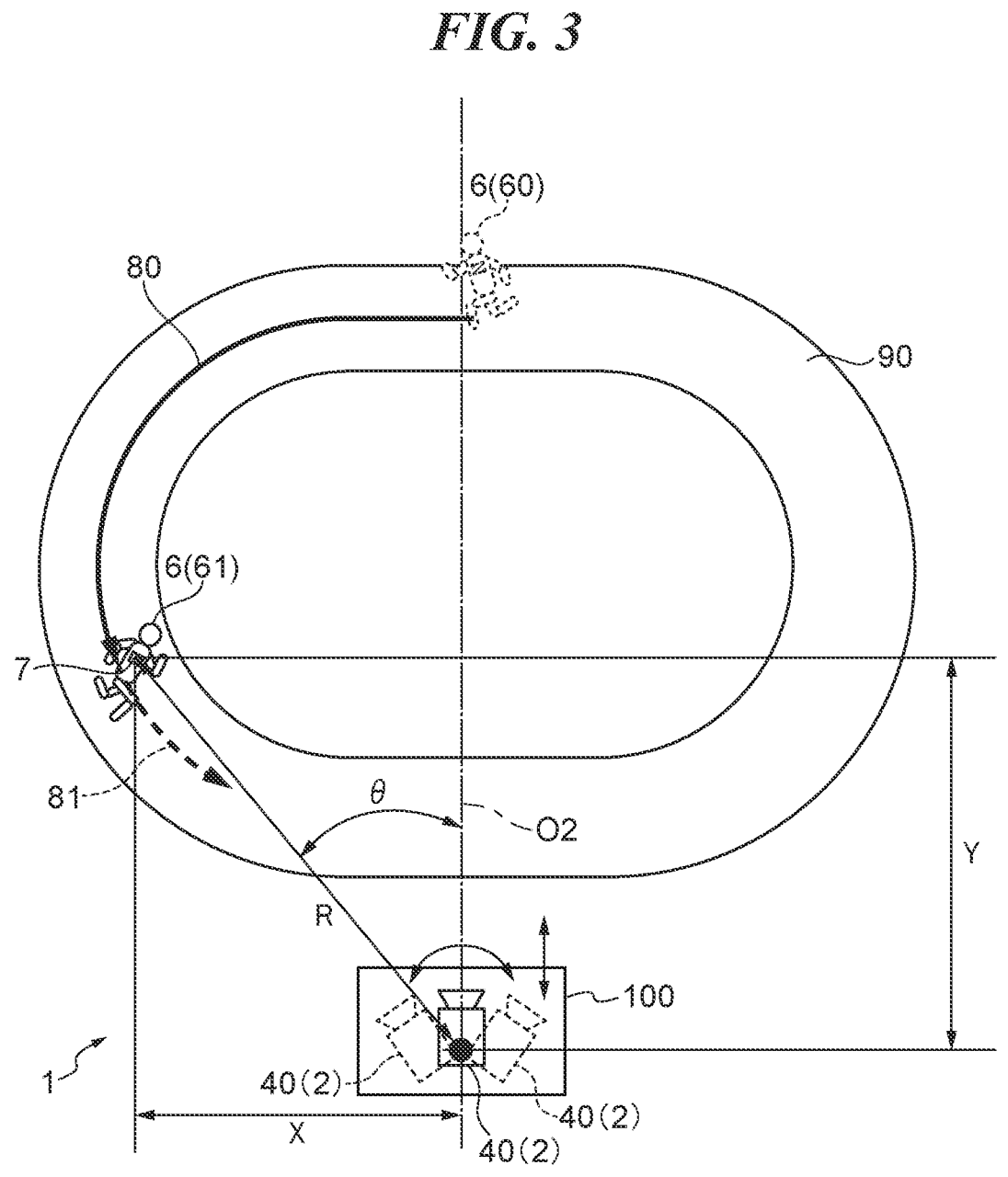

FIG. 3 is a schematic plan view showing an example of a use state of the image capturing apparatus shown in FIG. 1A. As shown in FIG. 3, the object 6 is running with the measurement unit 7 attached thereto along a running track 90 from a position 60 as a start position to a position 61 as a midway point of the running track 90. Further, the image capturing apparatus body 100 is disposed outside the running track 90 and is in a state capable of capturing an image of the object 6. Note that in the initial state of the image capturing apparatus body 100, the lens barrel 2 faces toward the position 60. When capturing images of the object 6, the image capturing apparatus body 100 controls the driving of the lens barrel 2 in the panning direction and the zooming direction from the initial state, and captures each image while changing the angle of view of the lens barrel 2. Further, the measurement unit 7 attached to the object 6 transmits the position information of the object 6 to the object position acquisition section 5 of the image capturing apparatus body 100. With this, the object position acquisition section 5 acquires coordinates (X, Y) of the object 6. A straight-line distance R $(=\sqrt{(X^2+Y^2)})$ between the lens barrel 2 (image capturing apparatus body 100) and the object 6 is calculated based on the coordinates (X, Y). Further, based on the coordinates (X, Y), an angle $\theta$ (tan $\theta=X/Y$) formed between a straight line between the lens barrel 2 and the object 6 and the optical axis O2 direction of the lens barrel 2 in the initial state is calculated. As the object 6 runs from the position 60 to the position 61, the position information of the object 6 acquired at predetermined time intervals is accumulated in the object position acquisition section 5. With this, the movement locus information 80 of the object 6 is acquired. Note that the moving speed and the acceleration of the object 6 are also calculated based on the position information of the object 6 acquired at the predetermined time intervals, and the moving speed and the acceleration are included in the movement locus information 80. The movement information prediction section 8 predicts, based on the movement locus information 80 (position information), a predicted movement locus (movement locus) 81 to be formed when the object 6 moves after acquisition of the movement locus information 80, as described hereinafter (operation of a locus prediction unit).

Figure 4:
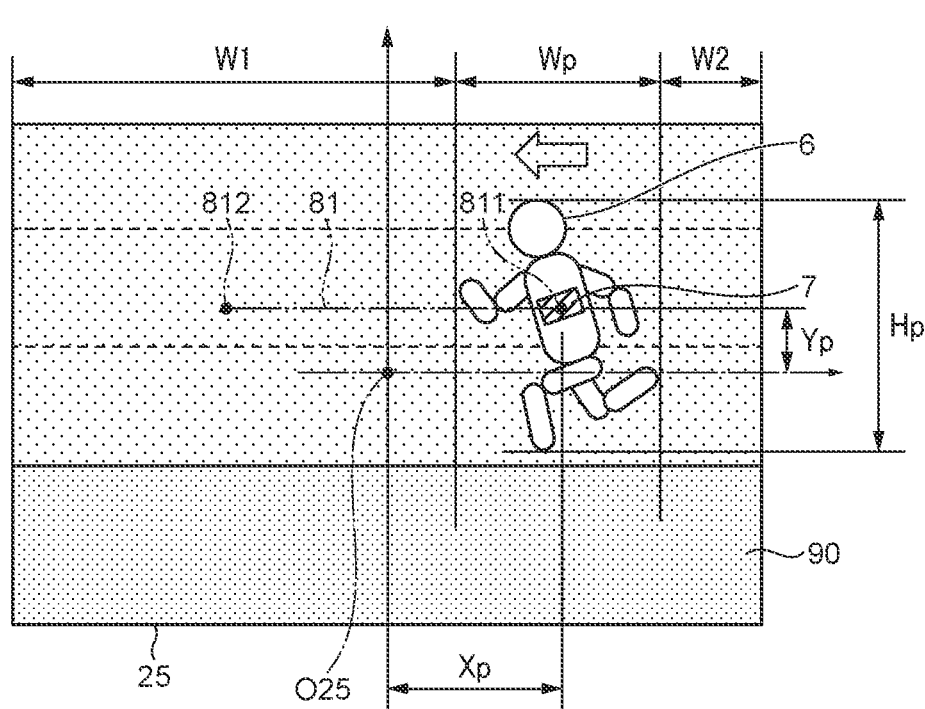
FIG. 4 is a diagram useful in explaining detection of an object, which is performed by an image processor.

FIG. 4 is a diagram useful in explaining detection of the object, which is performed by the image processor. An image 25 shown in FIG. 4 is an image captured by the lens barrel 2 of the image capturing apparatus body 100. The image processor 3 refers to information stored in the image capturing apparatus 1 in advance (compares information on the captured image with the stored information) to determine a type of the object 6 in the image 25, a state of the object 6, an image capturing scene (shooting situation), and so forth. Specifically, the image processor 3 determines a type and a state of the object 6 based on the contrast and feature point information of the object 6 in the image 25. With this, for example, whether the object 6 is a human being or an animal is determined, and whether or not the object 6 is riding on a vehicle, such as a bicycle, is determined. Further, the image processor 3 determines an image capturing scene based not only on the contrast and the feature point information of the object 6 in the image 25, but also on background information of the object 6. For example, in the case of FIG. 4, the image capturing scene is determined to be an image capturing scene in which the object 6 as the human being is running along the running track 90. Thus, in the present embodiment, the image processor 3 functions as a determination unit configured to determine a type and a state of the object 6 based on the image 25 and also functions as a scene determination unit configured to determine an image capturing scene of the image 25. Note that the image processor 3 is not limited to the image processor configured to determine both of a type and a state of the object 6 but can be configured to determine at least one of a type and a state. Then, in the view angle determination section 9, the angle of view is determined according to a result of the determination performed by the image processor 3.

Further, the image processor 3 can also calculate a position and a size of the object 6 in the image 25. Specifically, the image processor 3 can calculate a position (Xp, Yp) of the center of the object 6 with respect to a center O25 of the image 25, a height Hp of the object 6, and a width Wp of object 6. As the center of the object 6, for example, the position of the measurement unit 7 can be set. As mentioned above, the position of the measurement unit 7 can be obtained from the GPS. Further, the image processor 3 can also calculate a space W1 as an area in front of the object 6 in a moving direction of the object 6 (image of the object 6) and a space W2 as an area behind the object 6 in the moving direction. Then, the view angle determination section 9 can use the position (Xp, Yp), the height Hp, the width Wp, the space W1, and the space W2 for determination of the angle of view.

Figure 5:
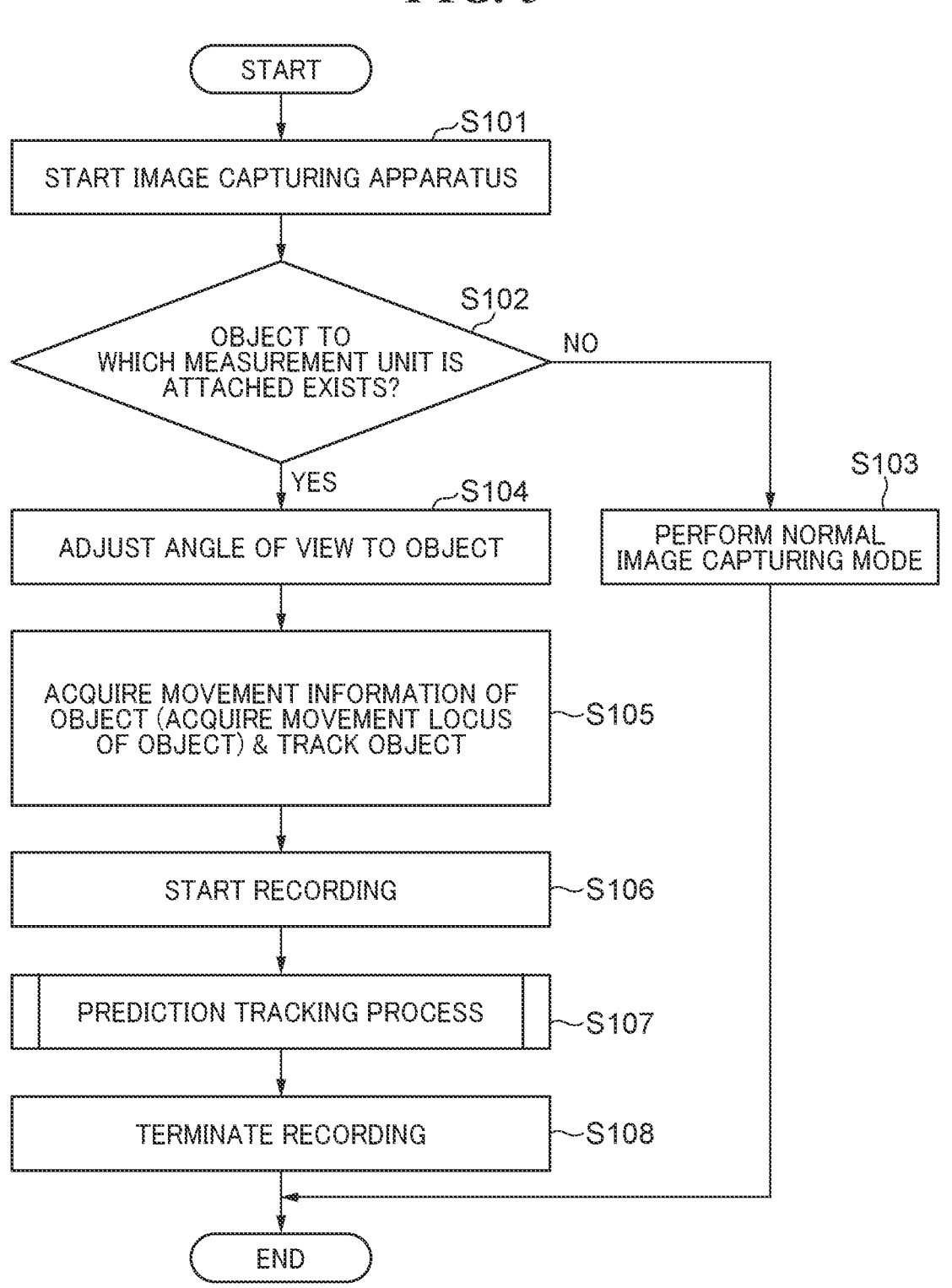
FIG. 5 is a flowchart of a process from startup of the image capturing apparatus to termination of image capturing.

FIG. 5 is a flowchart of a process from startup of the image capturing apparatus to termination of image capturing. A program of the process shown in FIG. 5 is executed by the CPU of the image capturing apparatus 1. As shown in FIG. 5, in a step S101, when a power button (not shown) of the image capturing apparatus 1 is operated, i.e. pressed, the image capturing apparatus 1 is started up.

In a step S102, the object position acquisition section 5 determines whether or not the object 6 to which the measurement unit 7 is attached exists. This determination is performed based on whether or not the position information transmitted from the measurement unit 7 has been acquired by the information acquisition section 51 of the object position acquisition section 5. In a case where the information acquisition section 51 has acquired the position information from the measurement unit 7, it is determined that the object 6 has been detected, i.e. the object 6 exists, whereas in a case where the information acquisition section 51 has not acquired the position information from the measurement unit 7, it is determined that the object 6 has not been detected, i.e. the object 6 does not exist. Then, if it is determined in the step S102 that the object 6 exists, the process proceeds to a step S104. On the other hand, if it is determined that the object 6 does not exist, the process proceeds to a step S103.

In the step S103, a normal image capturing mode is performed by the image capturing apparatus 1. The "normal image capturing mode" refers to a generally-performed image capturing mode, and in the present embodiment, particularly refers to an image capturing mode in which determination of the angle of view based on the movement information (movement locus) of the object 6 is omitted. Description of the normal image capturing mode is omitted. After execution of the step S103, the present process is terminated.

In the step S104, the lens barrel 2 is driven for panning and zooming by a control command from the driving controller 4. With this, the angle of view is adjusted to an angle of view at which the size of the object 6 in the image 25 is made appropriate. After execution of the step S104, the process proceeds to a step S105.

In the step S105, the time-varying or continuous position information of the object 6 is acquired by the object position acquisition section 5. With this, it is possible to acquire the movement locus formed when the object 6 has moved. Further, in the step S105, the driving of the lens barrel 2 is controlled to automatically track the object 6. After execution of the step S105, the process proceeds to a step S106.

In the step S106, when an image capturing button (not shown) of the image capturing apparatus 1 is operated, recording, i.e. image capturing of the object 6 is started. After execution of the step S106, the process proceeds to a step S107.

In the step S107, the movement information prediction section 8 performs a prediction tracking process with respect to the object 6. In this prediction tracking process, a movement locus to be formed in a case where the object 6 further moves is predicted by the movement information prediction section 8. Then, an angle of view based on this movement locus is determined by the view angle determination section 9.

In a step S108, when an image capturing stop button (not shown) of the image capturing apparatus 1 is operated, the recording is terminated. After execution of the step S108, the present process is terminated.

Figure 6:
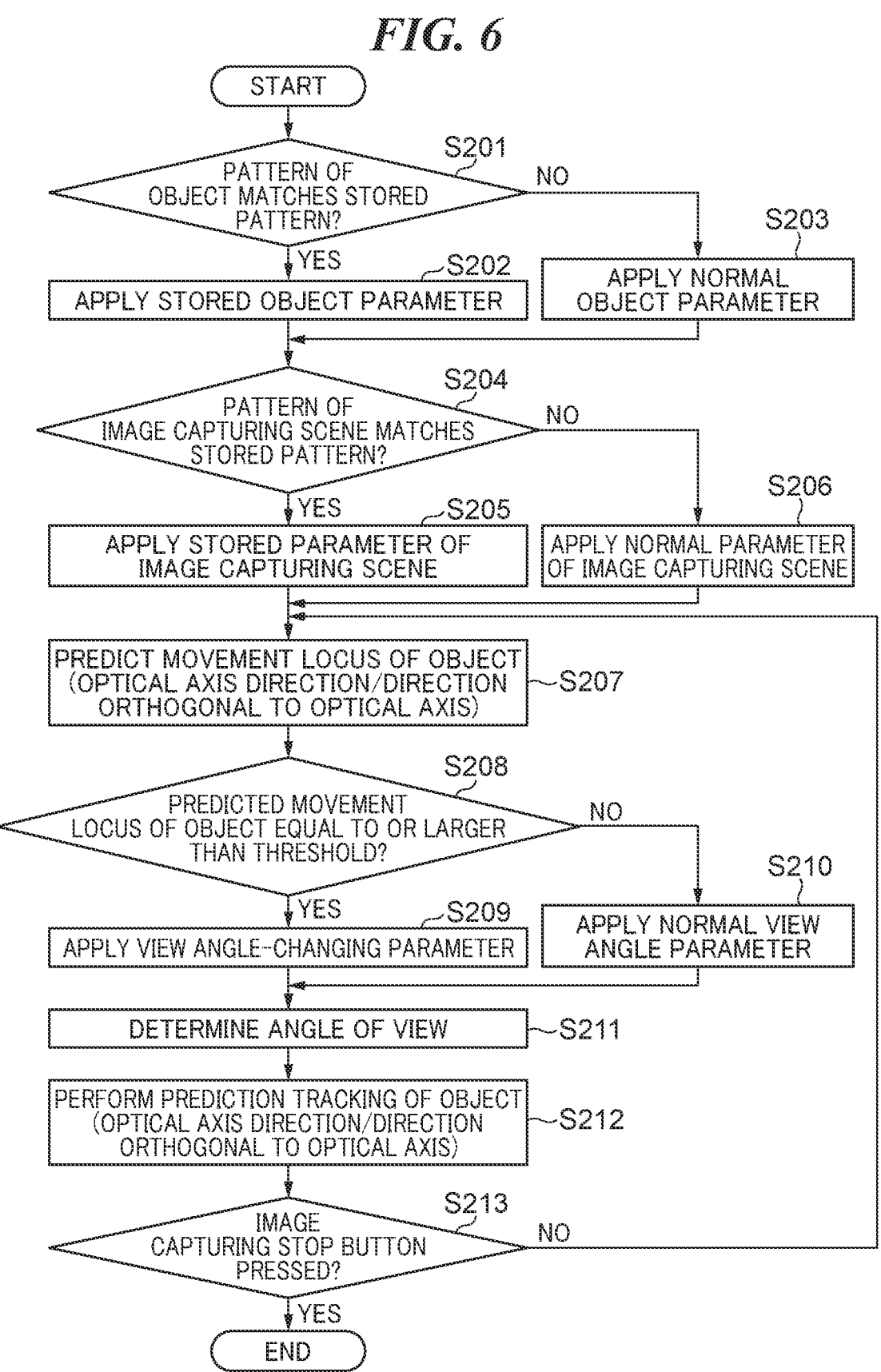
FIG. 6 is a flowchart of a prediction tracking process (subroutine) performed in a step of the process in FIG. 5.
Figure 7:
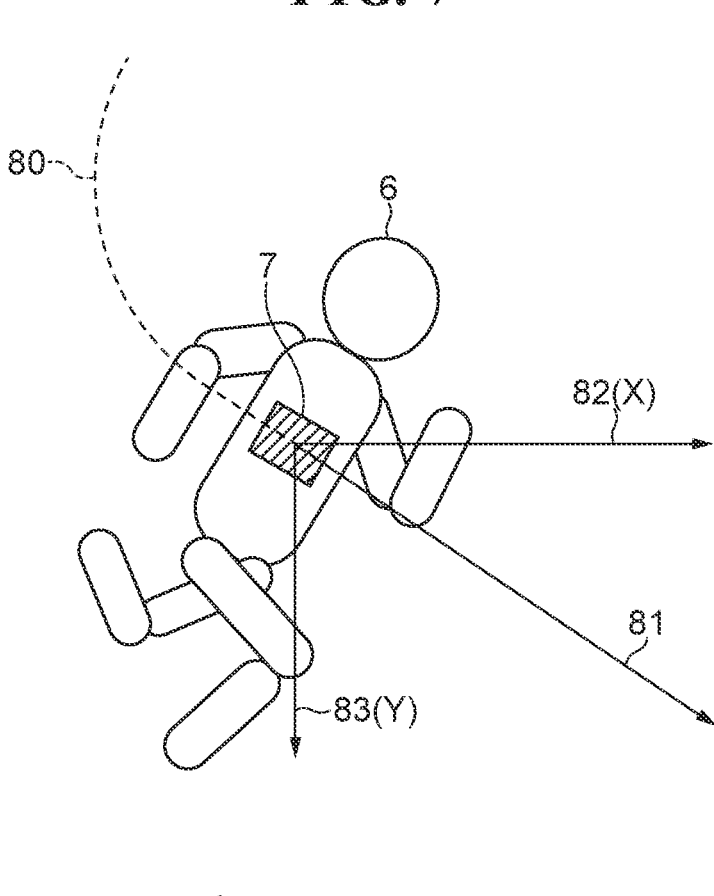
FIG. 7 is a schematic plan view useful in explaining the prediction tracking process performed on an object.
Figure 7:
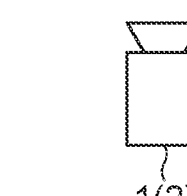
Figure 8:
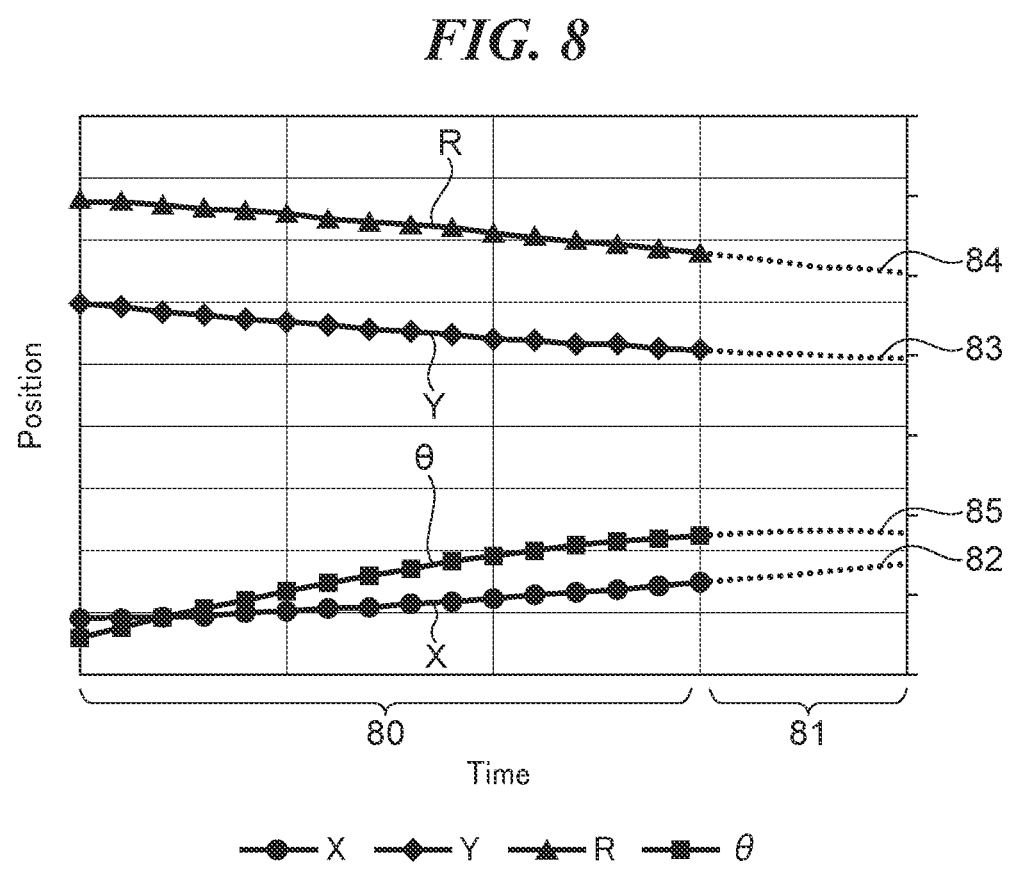

FIG. 6 is a flowchart of the prediction tracking process (subroutine) performed in the step S107 of the process in FIG. 5. FIG. 7 is a schematic plan view useful in explaining the prediction tracking process performed on the object. FIG. 8 is a graph showing the movement locus (past movement locus) and the predicted movement locus (future movement locus) of the object. This graph shown in FIG. 8 is generated by converting the time series data explained with reference to FIG. 7 to a graph. As shown in FIG. 6, in a step S201, determination is performed as to whether or not pattern information of the object 6 (the type and state of the object 6), which has been detected by the image processor 3 and sent to the movement information prediction section 8, matches pattern information stored in the image capturing apparatus 1 in advance. If it is determined in the step S201 that the two pattern information items match, the process proceeds to a step S202. On the other hand, if it is determined in the step S201 that the two pattern information items do not match, the process proceeds to a step S203. The process proceeds to the step S202 in the following case, for example: If it is determined by the image processor 3 that the object 6 is a human being who is running, the determination result is sent to the movement information prediction section 8. The image capturing apparatus 1 stores in advance a setting of a range of speeds at which a human being can run as a parameter. So, this parameter is compared with a result of the determination performed by the image processor 3, which is sent to the movement information prediction section 8, and for example, if the result of the determination is within the range of the parameter, it is determined that the two pattern information items match, and the process can proceed to the step S202.

In the step S202, as the movement condition of the object 6, the above-mentioned parameter stored in the image capturing apparatus 1 in advance is applied. Specifically, the driving speed of the lens barrel 2 driven by the driving controller 4 is limited within a predetermined range based on this parameter. This makes it possible to enhance the accuracy of tracking the object 6. After execution of the step S202, the process proceeds to a step S204.

In the step S203, as the movement condition of the object 6, a parameter of the object 6 who is actually running (normal parameter) is applied. After execution of the step S203, the process proceeds to the step S204.

In the step S204, whether or not information (pattern) of the image capturing scene (image capturing situation), which is detected by the image processor 3 and sent to the movement information prediction section 8, matches information of the image capturing scene, which is stored in the image capturing apparatus 1 (stored pattern). If it is determined in the step S204 that the two pattern information items match, the process proceeds to a step S205. On the other hand, if it is determined in the step S204 that the two pattern information items do not match, the process proceeds to a step S206. The process proceeds to the step S205, for example, in the following case: If it is determined by the image processor 3 that the actual image capturing scene is a scene in which a person is running along the running track 90, a result of the determination is sent to the movement information prediction section 8. The image capturing apparatus 1 stores in advance a setting of the scene in which a person is running along the running track 90 as a parameter. Then, this parameter and the result of the determination performed by the image processor 3, which is sent to the movement information prediction section 8, are compared, and for example, if the number of matching points is equal to or larger than a predetermined number, it is determined that both of the pattern information items match, and the process can proceed to the step S205.

In the step S205, as the parameter of the image capturing scene, the above-mentioned parameter stored in the image capturing apparatus 1 is applied. Specifically, for example, the driving range (the panning range and the zooming range) of the lens barrel 2 driven by the driving controller 4 is limited within a range in which the whole running track 90 is included in the angle of view, i.e. the running track 90 is prevented from being out of the angle of view. Further, the driving according to the applied parameter includes, for example, causing the driving controller 4 to drive the lens barrel 2 such that panning is performed along the running track 90. With this, in combination with the processing in the step S202, it is possible to further enhance the accuracy of tracking the object 6. After execution of the step S205, the process proceeds to a step S207.

In the step S206, as the parameter of the image capturing scene, a parameter of the actual image capturing scene (normal parameter) is applied. After execution of the step S206, the process proceeds to the step S207.

In the step S207, the movement locus information 80 calculated by the position calculation section 52 of the object position acquisition section 5 is received by the movement information prediction section 8. Then, the movement information prediction section 8 predicts the predicted movement locus 81 to be formed in a case where the object 6 moves after acquisition of the movement locus information 80. This prediction will be described with reference to FIGS. 7 and 8. As shown in FIG. 7, in the movement information prediction section 8, when predicting the predicted movement locus 81, a line extending from the end point of the movement locus included in the movement locus information 80 along the moving direction is set as the predicted movement locus 81. The predicted movement locus 81 includes an optical axis direction predicted movement locus 83 as a first component in the direction of the optical axis O2 of the lens barrel 2 and an optical axis-orthogonal direction predicted movement locus 82 as a second component in a direction orthogonal to the direction of the optical axis O2. Specifically, the movement information prediction section 8 predicts the predicted movement locus 81 by polynomially or linearly approximating a plurality of coordinates included in the movement locus information 80 (see FIG. 8). The movement information prediction section 8 divides the predicted movement locus 81 into the optical axis direction predicted movement locus 83 and the optical axis-orthogonal direction predicted movement locus 82. The length of the optical axis direction predicted movement locus 83 is equal to a distance between the Y coordinate of the image capturing apparatus body 100 and the Y coordinate of the object 6. The length of the optical axis-orthogonal direction predicted movement locus 82 is equal to a distance between the X coordinate of the image capturing apparatus body 100 and the X coordinate of the object 6. Based on the optical axis-orthogonal direction predicted movement locus 82 and the optical axis direction predicted movement locus 83, a straight-line distance predicted movement locus 84 which is a straight-line distance R between the image capturing apparatus body 100 and the object 6 ($=\sqrt{}$(length of the optical axis-orthogonal direction predicted movement locus 82)$^2$+(length of the optical axis direction predicted movement locus 83)$^2$) is calculated. Further, based on the optical axis-orthogonal direction predicted movement locus 82 and the optical axis direction predicted movement locus 83, there is calculated an angle predicted movement locus 85 which is a predicted locus of the angle θ (tan θ=(length of the optical axis-orthogonal direction predicted movement locus 82)/(length of the optical axis direction predicted movement locus 83) formed between the straight line between the lens barrel 2 and the object 6 and the optical axis O2 direction of the lens barrel 2 of the image capturing apparatus body 100 in the initial state. The image capturing apparatus body 100 performs the zooming operation of the lens barrel 2 based on the straight-line distance predicted movement locus 84, and the panning operation of the lens barrel 2 based on the angle predicted movement locus 85. Note that the predicted movement locus 81 includes information on the moving speed and the acceleration of the object 6. With this, the movement information prediction section 8 can also predict the moving speed and the acceleration of the object 6. After execution of the step S207, the process proceeds to a step S208.

In the step S208, the information of the predicted movement locus 81 is sent from the movement information prediction section 8 to the view angle determination section 9. Then, the view angle determination section 9 compares the predicted movement locus 81 with a threshold value stored in the image capturing apparatus 1 in advance and determines whether or not the predicted movement locus 81 is equal to or larger than the threshold value. If it is determined in the step S208 that the predicted movement locus 81 is equal to or larger than the threshold value, the process proceeds to a step S209. On the other hand, if it is determined in the step S208 that the predicted movement locus 81 is smaller than the threshold value, the process proceeds to a step S210. The process proceeds to the step S209, for example, in the following case: As mentioned above, the information on the moving speed and the acceleration of the object 6 is included in the predicted movement locus 81, and the movement information prediction section 8 can predict the moving speed and the acceleration of the object 6. For example, if the moving speed or the acceleration, which is predicted by the movement information prediction section 8, becomes equal to or larger than a threshold value, the object 6 can undesirably go outside the angle of view. Note that the threshold value used in this case is a moving speed or an acceleration of the object 6 at which the object 6 goes outside the angle of view, which is determined, for example, by experiment or simulation. The threshold value is stored in the image capturing apparatus body 100 in advance. Then, if the moving speed or the acceleration predicted by the movement information prediction section 8 is equal to or larger than the threshold value, it is determined that the predicted movement locus 81 is equal to or larger than the threshold value, so that the process can proceed to the step S209.

In the step S209, a predetermined view angle-changing parameter stored in the image capturing apparatus 1 is applied. Specifically, as shown in FIG. 4, the view angle determination section 9 determines, as the angle of view to be assumed, an angle of view which makes the space W1 as the area in front of the object 6 in the moving direction wider than the space W2 as the area behind the object 6 in the moving direction. That is, the view angle determination section 9 determines an angle of view at which the center O25 of the image 25 is included in the space W1 as the area in front of the object 6 in the moving direction within the image 25. Further, it is preferable that, as the angle of view to be assumed, the view angle determination section 9 determine an angle of view which causes points from a start point 811 to an end point 812 of the predicted movement locus 81 to be included in the image 25. Particularly, it is more preferable that the angle of view to be assumed is determined to be an angle of view which causes the points from the start point 811 to the end point 812 of the predicted movement locus 81 to be included in the space W1 and the width Wp. After execution of the step S209, the process proceeds to a step S211.

In the step S210, a normal view angle parameter is applied. After execution of the step S210, the process proceeds to the step S211.

In the step S211, the angle of view is determined as an angle of view for prediction tracking control based on the angle of view determined in the step S209 or S210. After execution of the step S211, the process proceeds to a step S212.

In the step S212, prediction tracking of the object 6 is performed. In this prediction tracking, the panning operation and the zooming operation of the lens barrel 2 are controlled such that the condition of the angle of view determined in the step S211 is satisfied. After execution of the step S212, the process proceeds to a step S213.

In the step S213, it is determined whether or not the image capturing stop button of the image capturing apparatus 1 has been operated. If it is determined in the step S213 that the image capturing stop button has been operated, the process is terminated. On the other hand, if it is determined in the step S213 that the image capturing stop button has not been operated, the process returns to the step S207, and the step S207 et seq. are sequentially executed.

As described above, in the image capturing apparatus 1, when performing image capturing of the moving object 6, it is possible to set the angle of view suitable for the image capturing, by executing the steps S209 and S211. With this, it is possible to quickly and accurately perform prediction tracking of the object 6 without depending on the moving conditions, such as the moving direction and the moving speed of the object 6, and for example, it is possible to prevent the object 6 from going out of the angle of view. Note that although the operations of the lens barrel 2 in the prediction tracking are the panning operation and the zooming operation in the present embodiment, this is not limitative, but for example, the panning operation, the tilting operation, and the zooming operation can be appropriately combined, for example, depending on a type of the object 6, an image capturing scene, and/or the like. Further, although the angle of view is changed by controlling the driving of the lens barrel 2 in the present embodiment, this is not limitative. For example, in a case where an image is generated by cutting off portions around the object 6 from a wide angle of view, the angle of view can be changed by changing a range of cutting out according to the predicted movement locus of the object 6.

Figure 9:
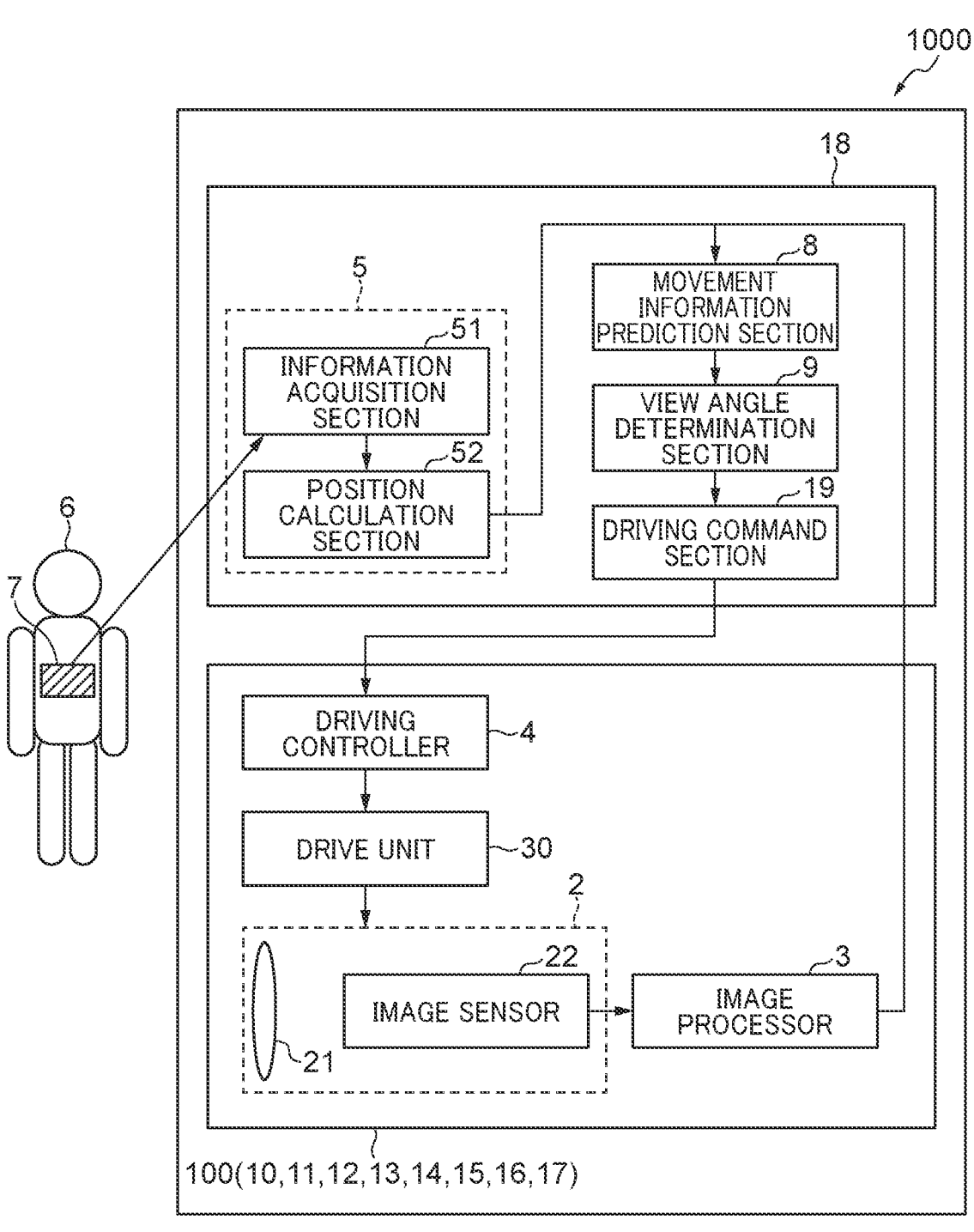
FIG. 9 is a block diagram showing a hardware configuration of an image capturing system according to a second embodiment of the present invention.
Figure 10:
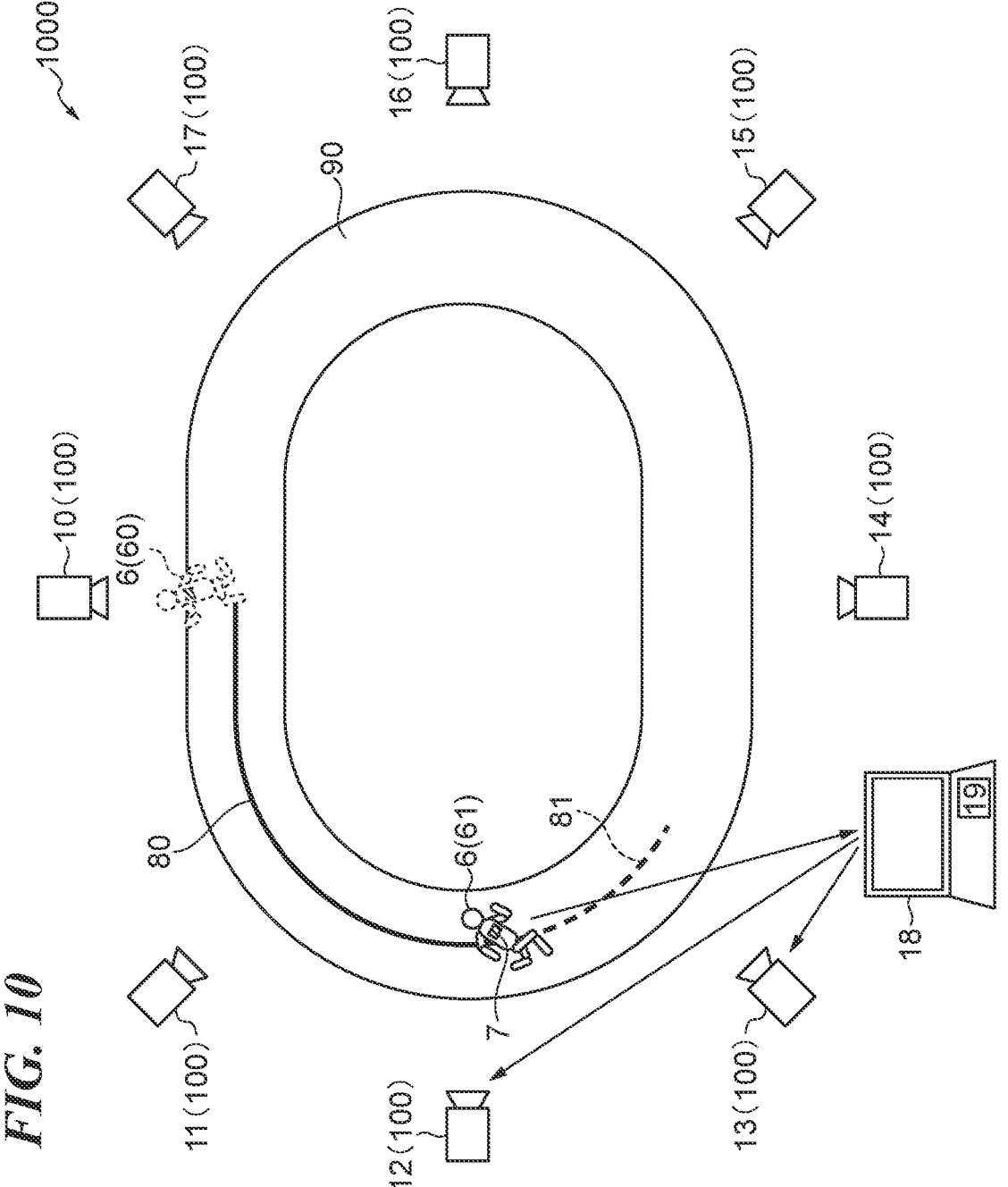
FIG. 10 is a schematic plan view showing an example of a use state of the image capturing system shown in FIG. 9.

Hereafter, a second embodiment will be described with reference to FIGS. 9 and 10, but the description is given mainly of a different point from the above-described embodiment, and description of the same points is omitted. The present embodiment is different from the first embodiment only in the number of disposed image capturing apparatus bodies and is the same as the first embodiment in the other points. FIG. 9 is a block diagram showing a hardware configuration of an image capturing system according to the second embodiment of the present invention. FIG. 10 is a schematic plan view showing an example of a use state of the image capturing system shown in FIG. 9. As shown in FIGS. 9 and 10, the image capturing system, denoted by reference numeral 1000, includes image capturing apparatus bodies 10 to 17 as the image capturing apparatus bodies 100, and a central controller 18 that controls the driving of each image capturing apparatus body 100. The image capturing apparatus bodies 10 to 17 are disposed at space intervals along the running track 90 and are communicably connected to the central controller 18. In the present embodiment, the image capturing apparatus bodies 10 to 17 are each provided with the lens barrel 2, the image processor 3, the driving controller 4, and the drive unit 30. The central controller 18 is provided with the object position acquisition section 5, the movement information prediction section 8, and the view angle determination section 9. Further, a driving command section 19 is provided in the central controller 18. By a command from the driving command section 19, the driving controller 4 of each image capturing apparatus body 100 (each of the image capturing apparatus bodies 10 to 17) can control the operation of the lens barrel 2 of the image capturing apparatus 100 in which this driving controller 4 is disposed. Further, the position information transmitted from the measurement unit 7 is transmitted to the object position acquisition section 5 of the central controller 18.

As shown in FIG. 10, in a case where the object 6 runs from the position 60 to the position 61 and further runs, the movement information prediction section 8 predicts the predicted movement locus 81 based on the movement locus information 80. Then, the view angle determination section 9 selects an image capturing apparatus body 100 to be preferentially used for capturing an image of the object 6 from among the image capturing apparatus bodies 10 to 17, based on the predicted movement locus 81. Thus, in the present embodiment, the view angle determination section 9 functions as a selection unit configured to select a predetermined image capturing apparatus body 100 from among the image capturing apparatus bodies 10 to 17. Note that in the image capturing system 1000, a part which functions as the selection unit may be provided separately from the view angle determination section 9. For example, when the object 6 is in the position 61, the view angle determination section 9 selects the image capturing apparatus body 12 which is closest to the position 61, and thereafter, the image capturing apparatus body 100 is changed to the image capturing apparatus body 13 positioned forward of the image capturing apparatus body 12 in the running direction based on the predicted movement locus 81. In this case, the view angle determination section 9 determines an angle of view of the lens barrel 2 of the image capturing apparatus body 13 based on the predicted movement locus 81.

As described above, in the image capturing system 1000, it is possible to select the image capturing apparatus body 100 preferentially used for capturing an image of the object 6 sequentially from among the image capturing apparatus bodies 10 to 17 and determine an angle of view of the selected image capturing apparatus body 100 whenever the image capturing apparatus body 100 is selected. With this, when performing image capturing of the running object 6, it is possible to use each of the image capturing apparatus bodies 10 to 17 in a relayed fashion, whereby it is possible to obtain an excellent image capturing result.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-005134 filed Jan. 17, 2023, which is hereby incorporated by reference herein in its entirety.

What is claimed is:

1. An image capturing apparatus comprising:
an image capturing unit having an image sensor and configured to capture an image of an object:
one or more processors; and
a memory storing a program which, when executed by the one or more processors, causes the one or more processors to function as:
a position acquisition unit configured to acquire time-varying position information of the object:
a locus prediction unit configured to predict, based on the position information, a movement locus to be formed as the object moves after acquisition of the position information; and
a view angle determination unit configured to determine, based on the movement locus, an angle of view of the image capturing unit.

2. The image capturing apparatus according to claim 1, wherein the locus prediction unit predicts the movement locus by polynomially or linearly approximating a plurality of coordinates included in the position information.

3. The image capturing apparatus according to claim 1, wherein the locus prediction unit divides the movement locus into a first component in an optical axis direction of the image capturing unit and a second component in a direction orthogonal to the optical axis direction, and predicts a straight-line distance between the image capturing unit and the object, and an angle formed between a straight line between the image capturing unit and the object and the optical axis direction, based on the first component and the second component.

4. The image capturing apparatus according to claim 3, wherein the program, when executed by the one or more processors, further causes the one or more processors to function as a control unit configured to control at least one of a panning operation, a tilting operation, and a zooming operation of the image capturing unit, and
the control unit is capable of controlling the zooming operation based on the straight-line distance, and controlling the at least one of the panning operation and the tilting operation based on the formed angle.

5. The image capturing apparatus according to claim 1, wherein the movement locus includes information on a moving speed and an acceleration of the object.

6. The image capturing apparatus according to claim 1, wherein as the angle of view, the view angle determination unit determines an angle of view at which the center of the image is caused to be included in an area forward of the image of the object in a moving direction in the image.

7. The image capturing apparatus according to claim 6, wherein as the angle of view, the view angle determination unit determines an angle of view at which points from a start point to an end point of the movement locus are caused to be included in the image.

8. The image capturing apparatus according to claim 1, wherein the program, when executed by the one or more processors, further causes the one or more processors to function as a determination unit configured to determine at least one of a type and a state of the object based on the image, and
the view angle determination unit determines the angle of view according to a result of the determination performed by the determination unit.

9. The image capturing apparatus according to claim 1, wherein the program, when executed by the one or more processors, further causes the one or more processors to function as a scene determination unit configured to determine an image capturing scene of the image based on the image, and
wherein the view angle determination unit determines the angle of view according to a result of the determination performed by the scene determination unit.

10. The image capturing apparatus according to claim 1, further comprising a transmission unit having a transmitter that is attached to the object and is configured to transmit the position information to the position acquisition unit.

11. An image capturing system comprising:
a plurality of image capturing units each having an image sensor and configured to capture an image of an object;
one or more processors; and
a memory storing a program which, when executed by the one or more processors, causes the one or more processors to function as:
a position acquisition unit configured to acquire time-varying position information of the object;
a locus prediction unit configured to predict, based on the position information, a movement locus to be formed when the object moves after acquisition of the position information; and
a selection unit configured to select an image capturing unit to be preferentially used for capturing an image of the object from the plurality of image capturing units based on the movement locus.

12. The image capturing system according to claim 11, further comprising a view angle determination unit configured to determine, based on the movement locus, an angle of view of the image capturing unit selected by the selection unit.

13. A method of controlling an image capturing apparatus including an image capturing unit having an image sensor and configured to capture an image of an object, comprising:
acquiring time-varying position information of the object;
predicting, based on the position information, a movement locus to be formed when the object moves after acquisition of the position information; and
determining, based on the movement locus, an angle of view of the image capturing unit.

14. A non-transitory computer-readable storage medium storing a program for causing a computer to execute a method of controlling an image capturing apparatus including an image capturing unit having an image sensor and configured to capture an image of an object,
wherein the method comprises:
acquiring time-varying position information of the object;

predicting, based on the position information, a movement locus to be formed when the object moves after acquisition of the position information; and determining, based on the movement locus, an angle of view of the image capturing unit.

\* \* \* \* \*